Figure 1:
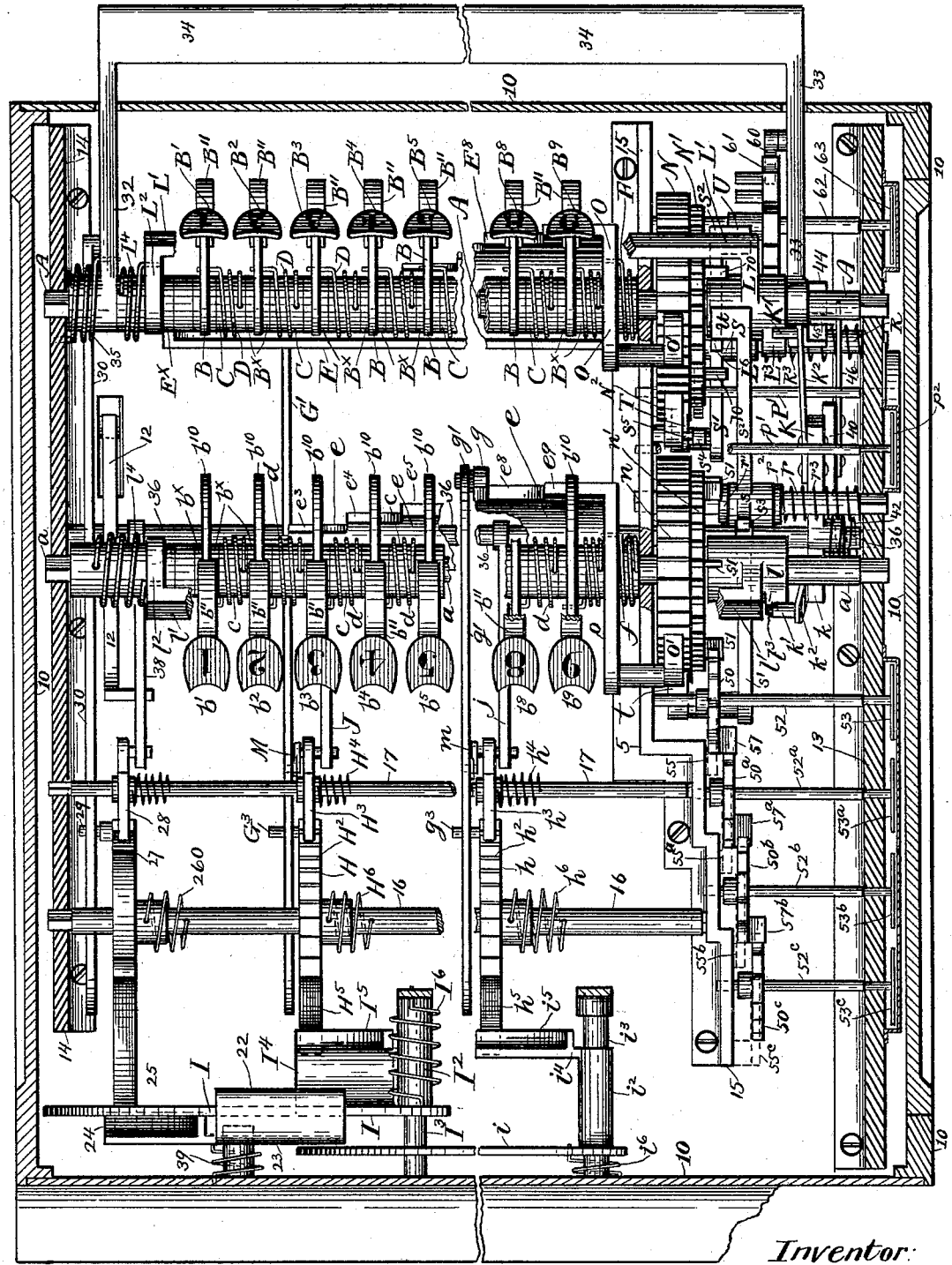

(No Model.) 5 Sheets—Sheet 1.

A. H. ULLRICH.
CASH REGISTER AND INDICATOR.

No. 508,194. Patented Nov. 7, 1893.

Witnesses:
J. Halpenny
H. E. Koch

Inventor:
Albert H Ullrich
By his attorneys,
Gridley & Hopkins (No Model.)
5 Sheets—Sheet 2.
A. H. ULLRICH.
CASH REGISTER AND INDICATOR.
No. 508,194.
Patented Nov. 7, 1893.
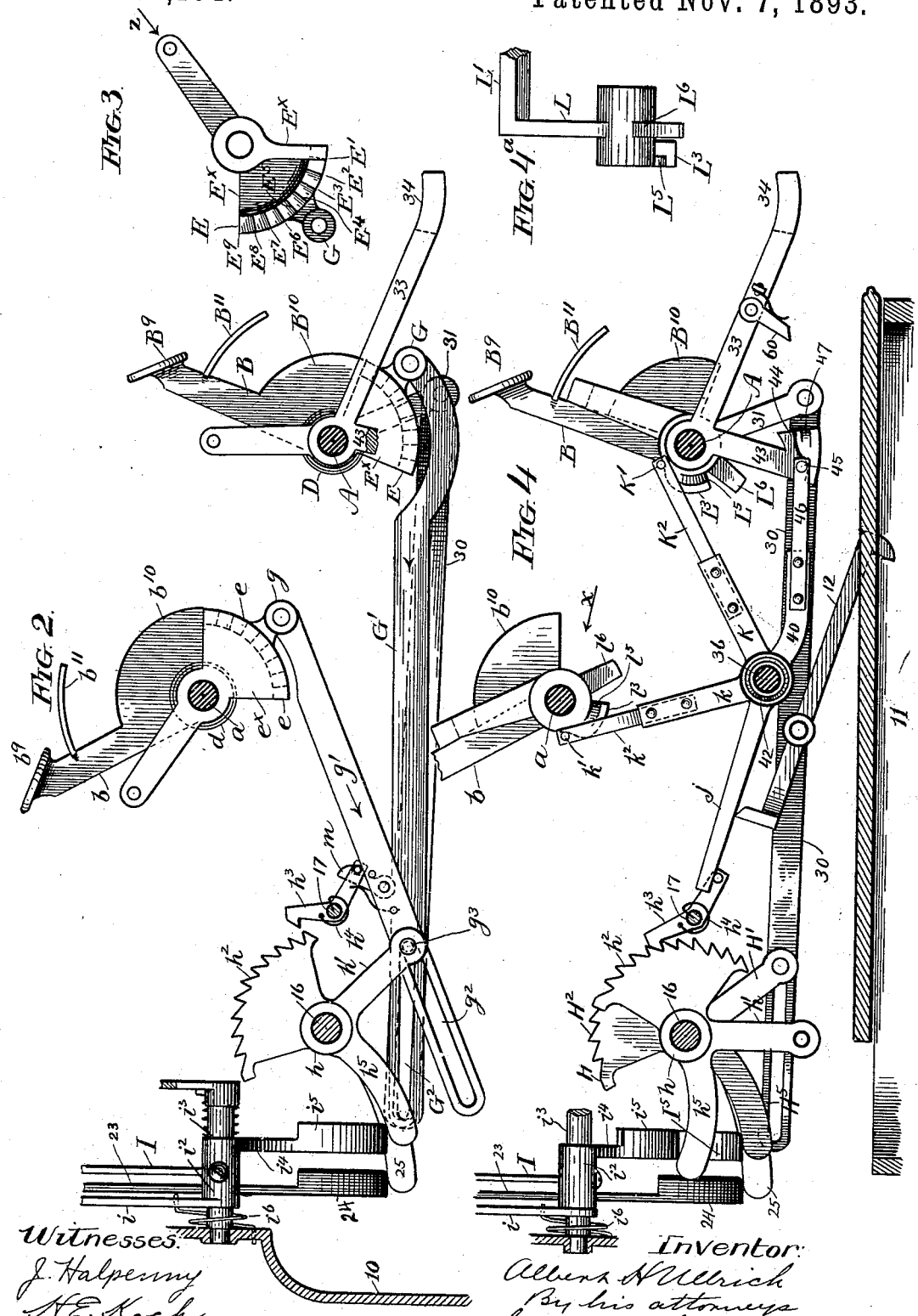
Witnesses:
J. Halpenny
H. E. Koch.
Inventor:
Albert H. Ullrich
By his attorneys
Gridley & Hopkins
THE NATIONAL LITHOGRAPHING COMPANY,
WASHINGTON, D. C.

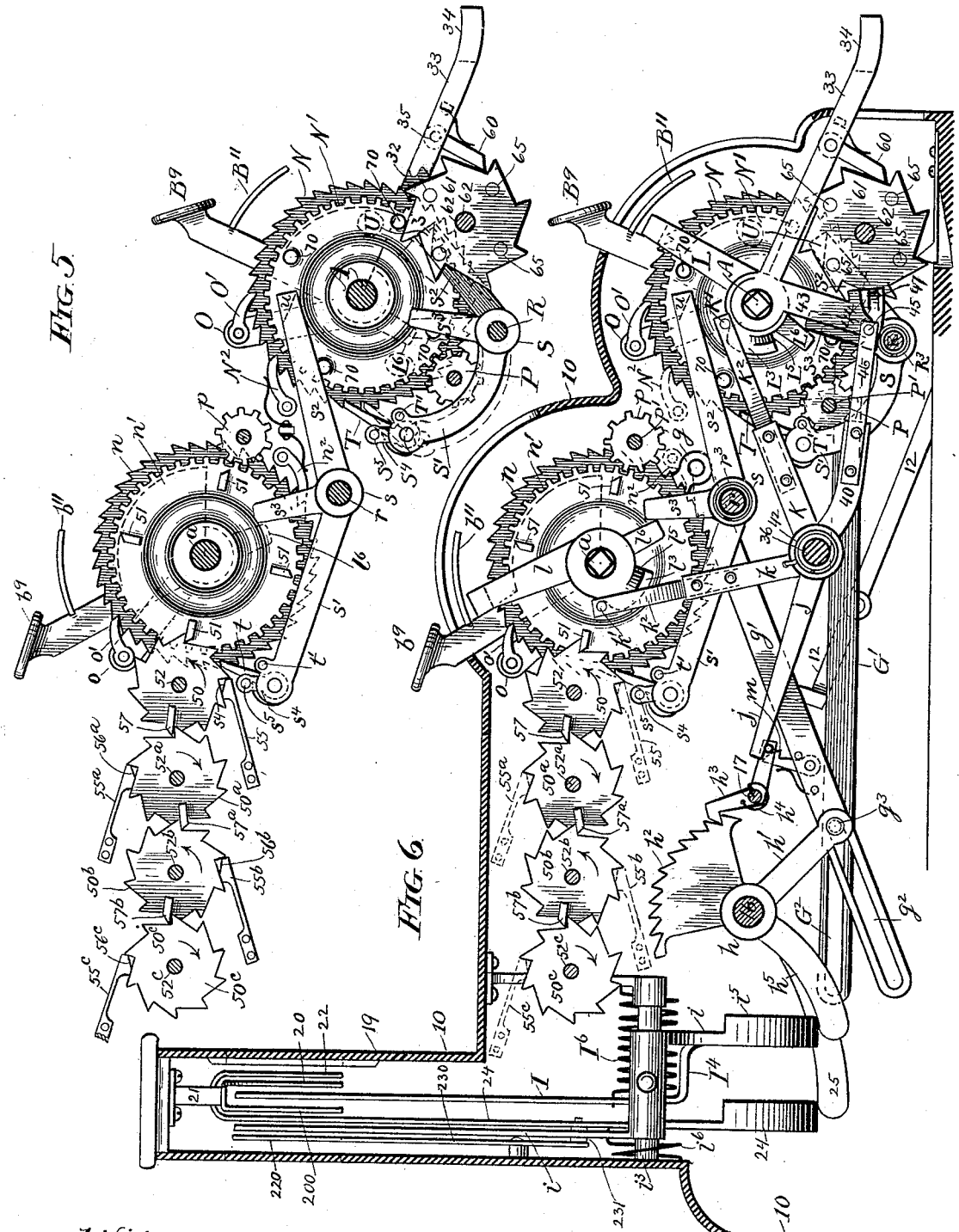

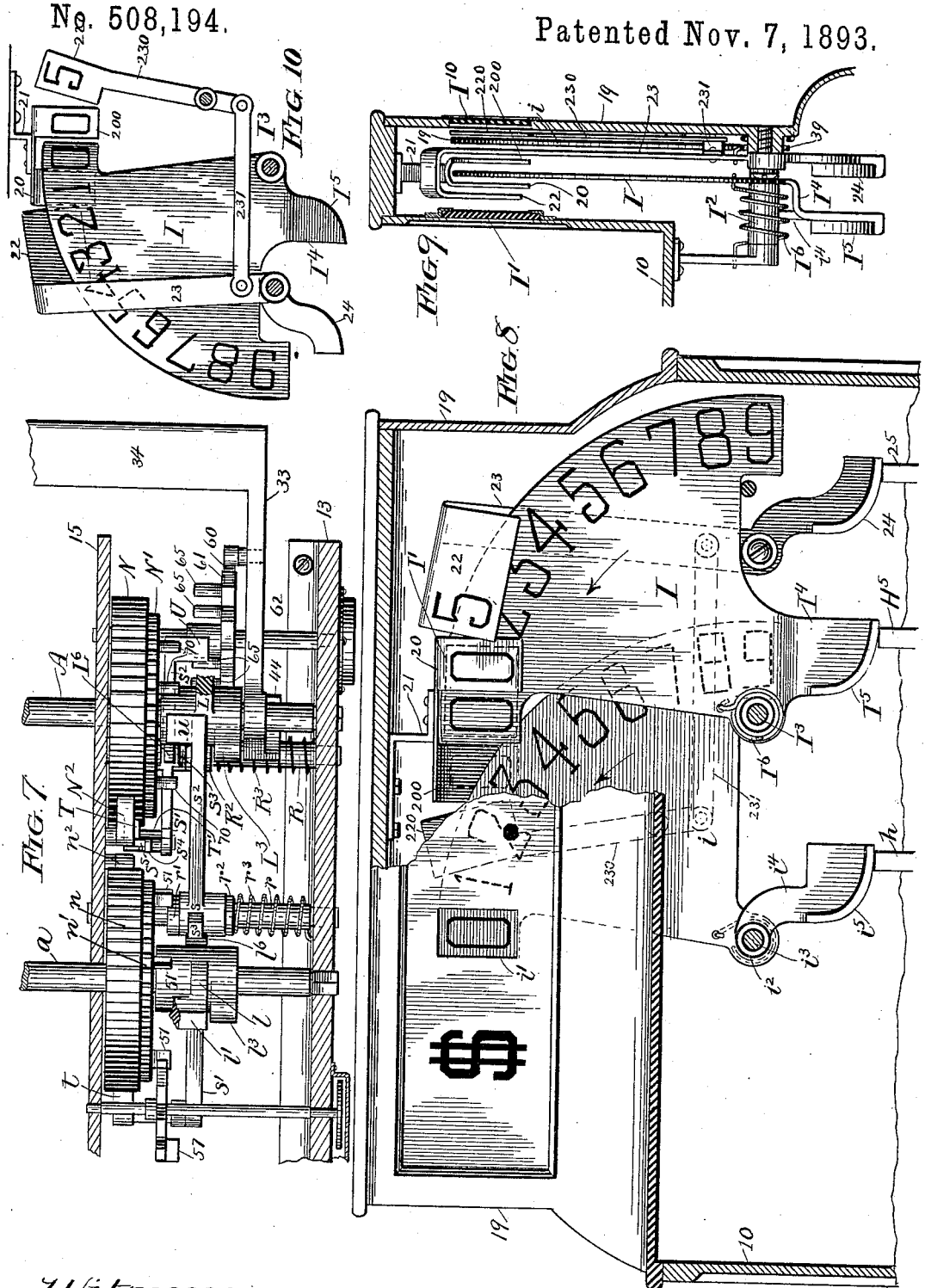

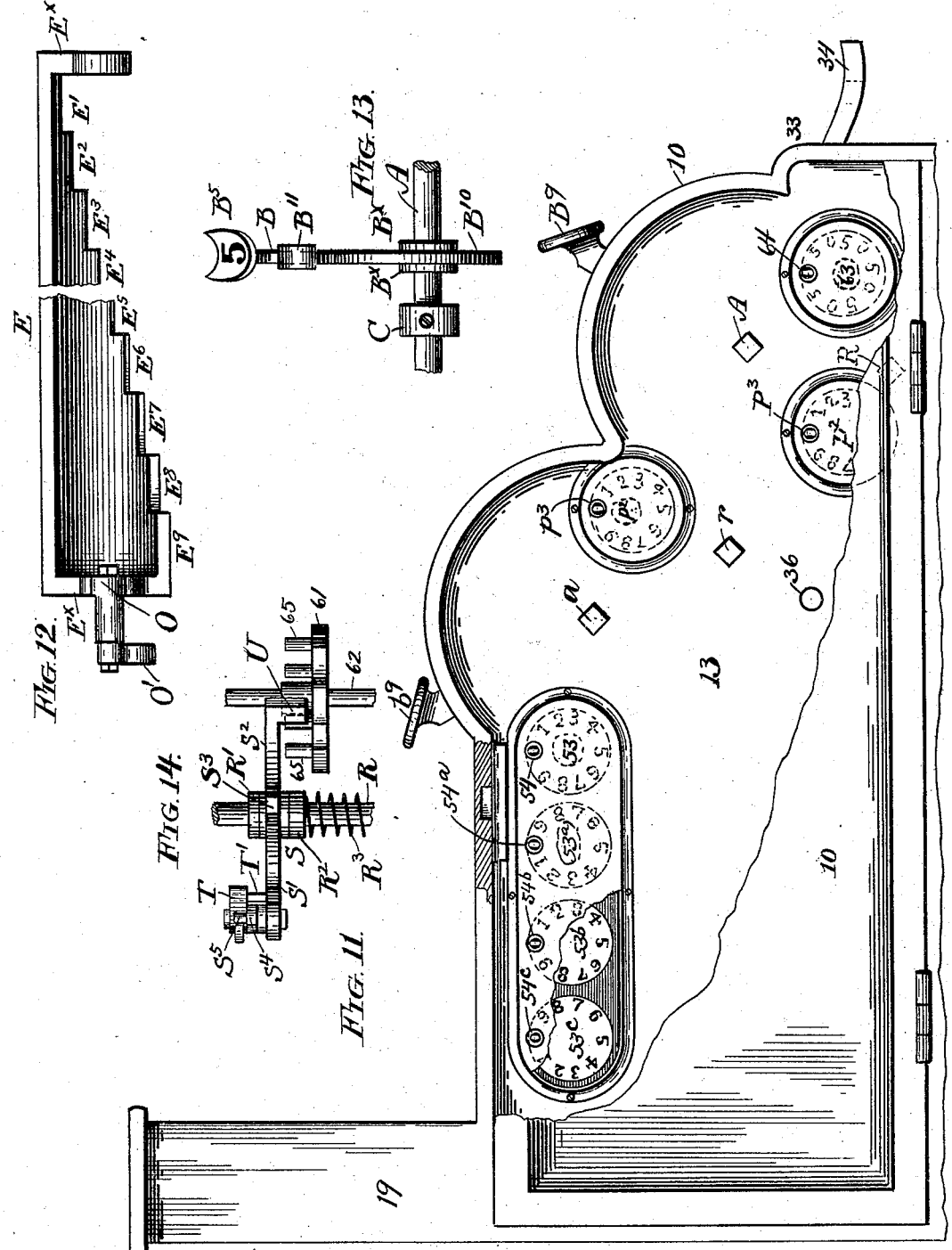

UNITED STATES PATENT OFFICE.

ALBERT H. ULLRICH, OF EVANSTON, ILLINOIS.

CASH REGISTER AND INDICATOR.

SPECIFICATION forming part of Letters Patent No. 508,194, dated November 7, 1893.

Application filed June 7, 1892. Serial No. 435,878. (No model.)

*To all whom it may concern:*

Be it known that I, ALBERT H. ULLRICH, a citizen of the United States, residing at Evanston, in the county of Cook and State of Illinois, have invented certain new and useful Improvements in Cash Registers and Indicators, of which the following is a specification.

The present invention relates to a cash register and indicator, and its object is to improve the construction of both the registering and the indicating mechanism.

The invention consists in certain features of novelty that are particularly pointed out in the claims hereinafter, and in order that it may be fully understood I will describe it with reference to the accompanying drawings, which are made a part hereof and in which—

Figure 1 is a plan view of a cash register and indicator embodying the invention, the casing and the supporting frame being shown in horizontal section on irregular lines. Fig. 2 is a side elevation of the operating keys, the mechanism for transmitting motion from them to the indicators proper for setting them and the detent for holding one of said indicators in the position in which it is thus set. Fig. 3 is an elevation of one of the parts thereof, viewed from the opposite end. Fig. 4 is a side elevation of operating keys, the detent for holding the near indicator "in sight" and the mechanism for tripping said detent and latch. Fig. 4ᵃ is a fragment of one of the parts viewed in the direction of the arrow $x$, Fig. 4. Fig. 5 is a side elevation of the improved "total adding" train. Fig. 6 is a side elevation of the entire registering and indicating mechanism, the casing being shown in vertical longitudinal section and the supporting frame being omitted. Fig. 7 is a plan view of the mechanism for transferring motion from the register wheel of one set of keys to the register wheel of the set of keys of next higher denomination, and so on. Fig. 8 is an elevation of the indicator proper a portion of the case being broken away in order to more clearly show them. Fig. 9 is an edge view of said indicators, and a vertical section of that portion of the case in which they are situated. Fig. 10 is a rear elevation (on a somewhat smaller scale) of the indicators for indicating dimes and nickels. Fig. 11 is a side elevation of the complete machine, a portion of the door being broken away to disclose the register. Fig. 12 is an elevation of the part that is shown in end view by Fig. 3, the part being viewed in the direction of the arrow $z$, Fig. 3. Fig. 13 is an elevation of one of the keys, a portion of the main shaft, and one of the sleeves by which the keys are held at proper distances apart. Fig. 14 is a plan view of the five cent register wheel, the lever for transmitting motion from it to the ten cent register wheel, and the friction brake for controlling the movement of said lever.

The machine shown in the drawings has two sets of operating keys, each comprising nine keys. Each key of one set represents a certain number of units of a given denomination while each key of the other set represents a certain number of units of a higher denomination, the number of units which each key represents being indicated by a number affixed to the key itself. In mechanical construction these two sets of keys and many of their accessories are alike, so that a description of one is equally applicable to the other, and hence for the sake of greater clearness and in order to avoid repetition, like parts in both of these sets of mechanism will be indicated by the same reference letters, but for the sake of distinction capital letters will be used for one and small letters for the other. The denominations of these two sets of keys may be respectively dollars and tens of dollars, or dimes and dollars, or cents and dimes, or any others, but in this specification we will suppose that they are dimes and dollars, the capital letters being used to indicate the dimes keys and their accessories.

The casing may be of any suitable form and construction and is indicated by 10 wherever shown in the drawings. In its lower part is a cash drawer 11 which is held normally closed by a latch 12, and behind it may be arranged a spring for throwing it open as soon as the latch is raised. This spring is not shown, nor is anything more than just the top part of the drawer shown, but these parts are well known in the art, and the present invention is not concerned with details in their construction.

Secured within the casing, one near each of its sides, are two stout plates 13 and 14, and between these is a third plate 15, all of which plates occupy vertical planes and afford bearings for the various shafts and other parts. These plates, or any of them, will hereinafter be referred to as the "frame," excepting where it is necessary to refer to them more particularly.

A represents the main shaft which is supported by the frame and is held against turning by any suitable means, as, for example, by squaring its ends, and the bearings in which they fit.

The operating keys $B'$ $B^2$ $B^3$, &c., consist of levers B fulcrumed upon the shaft A and passing out through slots appropriately arranged in the top of the casing, the keys being provided on their outer ends with heads each bearing a numeral indicating the number of units (dimes) that it represents. Each lever is formed with a short hub $B^x$, projecting in both directions, and between the hubs of the several levers are short sleeves C that are secured to the shaft so as to be incapable of turning thereon. To each of the key levers is secured one end of a spring D, which is coiled around and has its other end secured to one of the sleeves C, whereby the keys are held normally in elevated position.

E (Figs. 1, 2, 3 and 12) is a part, hereinafter called a "graduated bar," which is suspended from the shaft by means of arms $E^x$ and is held in normal position by a spring F, which is secured at one end to one of said arms and at the other to some fixed part of the machine. This graduated bar takes its name from the fact that one of its edges is graduated or provided with a number of steps or shoulders $E'$ $E^2$ $E^3$, &c. There are the same number of shoulders as there are keys, and the shoulders and keys of similar exponents are situated opposite each other—that is to say, the shoulder $E'$ is in the path of the key $B'$, the shoulder $E^2$ is in the path of the key $B^2$, and so on. Each of the keys is provided with an extension similar to the one shown at $B^{10}$ in Figs. 2 and 4, and the lower edges of all of these extensions occupy the same radial plane when the keys are in normal positions. When in normal position the key $B^9$ (or strictly speaking, its extension) is in contact with the shoulder $E^9$, so that there is no lost motion between them, and hence the graduated bar partakes of the entire movement of this key. This is the maximum movement of the graduated bar, (the keys all move the same distance) and will be regarded as comprising nine units of movement. The shoulder $E'$ is situated in the radial plane that is occupied by the lower edge of either of the levers when it has moved through eight of these nine units of movement, so that when the lever $B'$ is drawn down it will move through eight of its nine units of movement before it comes in contact with the shoulder $E'$ and hence will move the graduated bar only one-ninth as far as the lever $B^9$ does. Each of the shoulders from $E^2$ to $E^8$ inclusive, is, successively, one of these units of movement nearer the radial plane of the shoulder $E^9$ than the one immediately preceding it and hence the amount of lost motion between the levers and graduated bar decreases in similar ratio from $B'$ to $B^9$. That is to say, while all of the keys move the same distance, the key $B'$ will move the graduated bar through only one of its possible nine units of movement, the key $B^2$ will move it twice as far, the key $B^4$ four times as far, and so on up to key $B^9$, which moves it nine times as far as does the key $B'$.

Upon the under side of the graduated bar E is a perforated lug G, to which is pivoted one end of a rod $G'$ which, near its other end, is provided with an elongated slot $G^2$, through which projects a pin $G^3$, carried by one arm $H'$ of a lever H, fulcrumed upon a shaft 16. Upon another arm of this lever are ten ratchet teeth $H^2$ arranged concentric with the shaft 16, and with these teeth engages a pawl $H^3$ fulcrumed loosely upon a shaft 17, which is held against rotation and has fixed to it one end of a spring $H^4$, the other end of which is fixed to the pawl, whereby the latter is held in engagement with the ratchet. When the parts are all in normal positions—at zero—the pin G is at the extremity of the slot $G^2$, so that there is no lost motion between the lever H and rod $G'$, as the latter is being moved in the direction of the arrow (by the downward movement of one of the keys.) Consequently the movements of the graduated bar and lever, due to the downward movement of any key, are synchronous. But as soon as the key has reached the limit of its downward movement, the pawl $H^3$ will engage the last ratchet tooth that has passed it, and will hold the lever H in the position to which it has been moved, and the slot $G^2$ will permit the rod G and all of the other parts that have thus far been mentioned to return to their normal positions. Of course it will be understood that the ratchet teeth are so distributed that one ninth of the entire possible movement of the lever will carry one tooth past the pawl and that each additional one-ninth of said entire possible movement will carry an additional tooth past the pawl, said pawl being left in engagement with the ninth tooth when the lever has completed its greatest possible movement. For example, if the key $B^5$ is drawn down it will move through four ninths of its stroke before it comes in contact with the shoulder $E^5$ of the graduated bar. During the remaining five-ninths of its stroke it moves said graduated bar and also the rod $G'$, and also the lever H. But since four ninths of the movement of the key was spent before it began to act upon the lever H, the latter will of course partake of only the remaining five ninths, and be moved through only five ninths of its possible movement. This will cause five of its teeth to pass the pawl, and said pawl will engage said fifth tooth (as shown by Fig. 4) and hold the lever while the other parts return to normal positions as aforesaid.

The third arm $H^5$ of the lever H, operates the indicator proper I, which consists of a sector of a pivoted disk having, concentric with its pivot, a series of numerals corresponding to those borne by the several keys, and also zero (0) at the beginning of the series. This indicator is arranged within a vertical extension 19 of the casing which is provided with a window I', the position of which is indicated by dotted lines in Fig. 8. Any suitable means may be used for transmitting the movement of the lever to the indicator, but I prefer the arrangement shown in the drawings as it is effective and very simple. As shown, the indicator is secured to a sleeve $I^2$ that is supported by a shaft $I^3$ and from this sleeve projects downward an arm $I^4$, upon which is arranged a cam $I^5$, bearing upon the arm $H^5$ of the lever H, a spring $I^6$ being arranged to return the indicator to zero. I prefer to use a cam so graduated that the lever $H^5$ will not have an accelerated effect upon the indicator as it rises and approaches its center of motion, but this is not essential, as the same ultimate object, namely, the bringing of the figures of the indicator directly opposite the window, may be accomplished by placing said figures successively farther apart, or by differently spacing the shoulders of the graduated bar.

The windows I' and i' are alike, except that the latter is large enough to display only one figure of the indicator, while the former is large enough to display two figures of the indicator, and would display two if it were not for a curtain 20, which is supported in front of the indicator and opposite the sinister side of the window by means of an arm 21 secured to the casing. This curtain bears the mark "0" (zero) that appears at the right of any figure of the indicator that is displayed at the window I' and is read with it. Thus, if the key $B^5$ is depressed, the indicator I will be moved, by means of the mechanism already described, until its figure "5" appears at the window I', at the left of the zero, and the two being read together indicate fifty cents. If, at the same time the key $B^5$ is drawn down, the key $b^2$ also be drawn down, in addition to displaying the "5" of indicator I, at the window I', the "2" of indicator i will be displayed at the window i', and the indicator will then read "$2.50c."

If the indicator I is intended to denote cents instead of dimes, the opening I' may be made just large enough to display one figure, and the shield 20 may be dispensed with. But the object of the arrangement shown in the drawings is to permit an indicator bearing the figure five (5) to be displayed at the right of any figure of the indicator I that is displayed at the window, so that the two figures can be read together. This additional indicator is shown at 22 and is carried by a pivoted arm 23 which is situated behind the indicator I and has its upper end bent so as to pass over said indicator and support the indicator 22 in a plane in front of the plane of the curtain 20. The lower arm of this lever 23 has a cam 24, (similar to the cam $I^5$) with which engages the arm 25 of a lever 26, having a ratchet tooth 27 with which engages a spring actuated pawl 28 fulcrumed loosely upon the shaft 17. This lever 26 has an arm similar to the arm H' of the lever H and on this arm is a pin 29 that projects through a slot in a rod 30 similar to the rod G'. The forward end of this rod is pivoted to an arm 31 of a lever 32 that is fulcrumed upon the shaft A and extends out through a slot in the front of the casing. A similar lever 33 is fulcrumed to the shaft A near its other end, and the outer ends of the two levers are connected by a bar 34 situated on the outside of the casing and extending nearly or quite across the front of the machine, a spring 35 being provided for holding the parts in normal position. This bar 34 constitutes a special key which can be reached and operated by the palm of the hand that is used for operating any one of the dimes keys, so that if the last figure of the amount is "5" instead of a cipher, it can be indicated with perfect facility. For example if $1.75 is to be indicated, pull down the keys $b'$ and $B^7$ and with the palm of the hand that is used for pulling down the key $B^7$ press upon the special key 34 and the indicators will show the desired amount.

By using mechanism for indicating five cents in connection with any number of dimes, I am enabled to dispense with all keys that are usually used for indicating all amounts ending with five, such for example as fifteen cents, twenty-five cents, and so on, and by making the key for operating this mechanism conspicuous and arranging it apart from the rest of the keys, it can be easily and quickly found by the operator.

In order to permit the indicators to be read from the back, as well as from the front of the vertical extension 19 of the case, the following additional devices are employed. The indicators I and i are similarly inscribed on both sides. A window $I^{10}$ is so situated that its dexter side is opposite the dexter side of the window I' and a window $i^{10}$ is situated directly opposite the window i'. Opposite the sinister side of the window $I^{10}$ is a curtain 200 supported by the arm 21 and inscribed with zero (0). An indicator inscribed with five (5) is secured to the upper end of a lever 230, the lower end of which is connected to the lever 23 by a link 231. The indicator 220 is situated in a plane in front of the curtain 200, so that when the lever 23 is moved so as to bring the indicator 22 in front of the curtain 20, it will (acting through the link 231) move the lever 230 so as to bring the indicator 220 in front of the curtain 200. Instead of this arrangement, the curtain 200 may be inscribed with five (5) and a slide inscribed with zero (0) may be so secured to an arm projecting from the lever 23 that normally the said slide bearing zero will be in front of the curtain bearing five (5). Then when the lever 23 is moved so as to move indicator 22 in front of the curtain 20, it will at the same time move the slide inscribed "0" from in front of the curtain bearing "5." This transposition is also possible with the curtain 20 and indicator 22.

This completes the description of the mechanism for setting the indicators and holding them set, and I will now describe the mechanism for releasing them and permitting them to be returned to zero. They should all be released whenever any key is depressed, and in order to do this it is simply necessary to trip all of the detents that hold them in set positions, and their suitably arranged springs will return the parts to normal positions.

Secured to a rock-shaft 36 are arms J and $j$ adapted to engage and trip the pawls $H^3$ and $h^3$ respectively, an arm 38 adapted to engage and trip the pawl 28 and drawer latch 12, an arm 40 adapted to be operated by the special key 34, an arm K adapted to be operated by any key of the dimes set, and an arm $k$ adapted to be operated by any key of the dollars set. (Here the description will be again confined to the dimes part of the machine).

L is an arm fulcrumed upon the shaft A and L' is a bar secured to its outer end and extending in contact with the front edges of all of the keys to the other side of the machine, where it joins an arm $L^2$ similarly fulcrumed to the shaft A and engaged by a spring $L^4$, whereby the arms and the bar are held in their normal positions, as shown in the drawings. Upon the hub of the arm L is a cam $L^3$, upon which bears a pin K' that projects laterally from a plate-spring $K^2$ that is secured to and forms a continuation of the arm K. When any one of the keys is depressed it carries with it the bar L' and thereby turns the cam $L^3$. As the rise of the cam is quite abrupt, before the key has proceeded very far in its downward course, the cam, bearing against the pin K' will have moved the arm K—$K^2$, rocked the shaft 36 and moved the arms J, $j$ and 38 far enough to trip the drawer latch 12 and all of the indicator detents. While the concentric portion of the cam is passing the pin K', the springs $I^6$, $i^6$ and 39 will return the indicators to zero, and the springs $H^6$ $h^6$ and 260 return the levers H, $h$ and 26 to normal positions. In order to allow time for the levers H and $h$ to return to normal positions, and insure that their pawls shall not return to engagement with them until they have done so, spring actuated latches M and $m$ are pivoted to the rods G' and $g'$ respectively in such positions that when either of said rods is in normal position and the corresponding detent is tripped, the latch will engage a pin carried by the heel of the pawl of the detent and thus hold the pawl out of engagement with its ratchet. The latches are so arranged that a movement of the rods (or either of them) in the direction of the arrow will free said latches from the pawls and allow the latter to return to engagement. When the pin K' comes to the end of the cam $L^3$, a spring 42 surrounding shaft 36 causes it to rock back to normal position, bringing the pin against the hub of the arm L and opposite the deep end of a groove $L^5$ which is formed in the end of the cam, concentric with the axis of motion, and when the pressure upon the key is removed the several parts are returned to normal positions by their respective springs, as already described. The pin K' enters the deep end of the groove $L^5$ and as the eccentric continues in its backward movement the cam shaped bottom of said groove (which gets gradually shallower) forces the pin K' endwise, causing the spring arm K—$K^2$ to yield laterally. As soon, however, as the pin emerges from the shallow end of the groove the spring arm regains its normal condition and thrusts the pin across the face of the cam in readiness for the next operation.

Projecting radially from the hub of the lever 33 is an arm 43, which carries a cam 44 upon which rests a pin 45, that projects laterally from a plate spring 46 that is secured to, and forms a continuation of, the arm 40. When the special key 34 is depressed the cam 44, acting upon the pin 45, moves the arm 40—46, rocks the shaft 36, and moves the arms 38, J and $j$, tripping the drawer latch 12 and indicator detents just as above described with reference to any key of either the dimes or the dollars set. When the cam has passed the pin 45 the spring 42 restores the rock shaft 36 and its accessories to normal position, as before, and this brings the pin 45 opposite a groove 47 formed in the cam 44 in the same manner and for the same purpose as groove $L^5$ is formed in cam $L^3$. This completes the description of the indicating mechanism.

I desire to have it understood that I reserve the right to use this mechanism without any registering mechanism whatever, or in connection with registering mechanism of any construction, although I prefer to use it in connection with registering mechanism constructed as shown in the drawings and now to be described.

Mounted loosely upon the shaft A and either secured together or formed in one, are a wheel N, having forty ratchet teeth and a wheel N' having forty cog teeth, and pivoted to a fixed part of the frame is a pawl $N^2$ engaging the ratchet wheel for holding both wheels against retrograde movement. Projecting upward from the arm $E^x$ of the graduated bar E, is an arm O, carrying a pawl O' that engages the ratchet wheel N and turns it when moved in one direction, and that slips freely over the teeth of said wheel when moved in the other direction. This pawl will of course partake of every movement of the graduated bar, and as the teeth of wheel N are the same number of degrees apart as the shoulders of said bar, it follows that the movements of the ratchet wheel and bar will be similar in point of distance. That is to say, when the key B' is depressed the bar will be moved through one of its nine possible units of movement and the ratchet wheel will be advanced one tooth. Similarly the depression of the key $B^5$ will cause the ratchet wheel to be advanced five teeth and so on. Gearing with the pinion N' is a smaller pinion P upon the outer end of the shaft P' of which is an index wheel $P^2$ graduated from zero to nine, and arranged behind a plate secured to the plate 13, or other suitable part, and having an opening $P^3$, through which only one of the numbers of the index wheel is visible at a time, for showing the amount represented by any previously operated key or keys of the dimes set up to "nine dimes." Similar mechanism, accessory to the shaft $a$, shows the amount represented by any previously operated key or keys of the dollars set up to "nine dollars." Each time the aggregate of the dimes register is ten, the index wheel completes its cycle and returns zero to the opening $P^3$ and at the same time mechanism, which I will call the transfer mechanism, is so set and operated that the amount (one dollar) will be transferred to the dollars register, moving the latter one space. Similarly each time the aggregate of the dollars register is ten, its index wheel completes its cycle and zero arrives at the opening $p^3$ and the amount (ten dollars) is transferred to the first wheel 50 of the total adding train. To accomplish this latter transfer, four equi-distant studs 51, are arranged on the outer flat face of the wheel $n'$ and so located that when the dollars register shows an aggregate of nine, one of said studs comes in contact with one of the ten teeth of the wheel 50. Then, as the wheel $n'$ moves through the next space it shifts wheel 50 one space and brings its next tooth in position for engagement by the next stud 51. The shaft 52 of the wheel 50 carries an index wheel 53 which is graduated from 0 to 9 and works behind a plate having an opening 54, through which one of its figures is visible. Engaging the wheel 50 is a spring pawl 55, having a cam face at 56, so formed that should the stud 51 fail to move the wheel quite as far as it should, said cam pressing against the summit of the tooth will complete the movement. The wheel 50 carries a single stud 57 so located that when the index wheel 53 shows "9" (indicating ninety dollars) said stud will engage one of the ten teeth of the second wheel $50^a$ of the total adding train, and as the index wheel moves from 9 to 0, the stud 57 will move the wheel $50^a$ one tooth in the same manner as the stud 51 moved the wheel 50, and with like effect. The third wheel of the total adding train is shown at $50^b$ and the fourth at $50^c$. All of these four wheels have similar accessories, and similar parts are indicated by similar numbers, except that the exponents "$a$," "$b$" and "$c$" are added to the numbers used to designate the parts accessory to the wheels $50^a$ $50^b$ $50^c$ respectively. The index wheels 53, $53^a$ $53^b$ and $53^c$ indicate tens, hundreds, thousands and tens of thousands respectively.

Pivoted to the arm 33 of the special key 34 is a pawl 60 which is held by a spring in engagement with a ratchet wheel 61, secured to a shaft 62, having an index wheel 63 marked alternately zero (0) and five (5) and working behind a plate having an opening 64. Each time the special key is depressed the wheel 61 is turned one tooth and the index wheel advanced from 0 to 5 or from 5 to 0, as the case may be.

Supported by the frame and held against rotation is a shaft R, having a shoulder R' and upon this shaft is fulcrumed a lever S, the hub of which is held between the shoulder R' and a movable washer $R^2$ by a spring $R^3$. This holding device leaves the lever free to be moved by a pressure sufficient to overcome the friction put upon it, while it will hold the lever in whatever position it is moved to, and prevent it from being moved by gravity, or by momentum when once set in motion. The lever has an arm S' that carries a pawl T that is held in engagement with the ratchet wheel N by a spring, and a stud T' for limiting the movement of the pawl toward the wheel and preventing it from passing more than one tooth at each operation. It has a second arm $S^2$ that projects past the face of the wheel 61 and has a lateral projection U, the under side of which is sloped to form a cam. This cam lies normally in the path of four equi-distant studs 65 that project outward from the face of the wheel, the parts being so located and proportioned that when the index 63 shows "5" one of said studs will come to a position of engagement with said cam, and as the said index wheel moves from 5 to 0, the stud will pass the cam and in doing so rock the lever to the position indicated by dotted lines in Fig. 5. This draws the pawl T over one tooth of the wheel N, which it engages. The friction holding device then holds the lever in this new position until it is returned to normal position by the spring $L^4$ acting through the arm $L^2$, bar L', arm L, an arm $L^6$ projecting from the hub of the arm L, and a third arm $S^3$ of the lever S. Normally the arm $L^6$ is in engagement with the arm $S^3$ and consequently if all the keys of the dimes set are in normal position at the time of the operation that shifted the transfer lever S to the dotted position, the arm $S^3$ bearing against the arm $L^6$ will shift the latter and with it the arm L, bar L' and arm $L^2$ and tighten the spring $L^4$. Then, just as soon as the stud 65 passes the cam U, the said spring $L^4$ will restore the lever to normal position (acting through the parts $L^2$ L' L and $L^6$ as already described) and in returning to normal position said lever will turn the dimes register wheel one tooth. If all of the dimes keys are not in normal position at the time of the operation that shifts the transfer lever to the dotted position, or in other words, if one of the dimes keys was operated at the same time, the friction clamp holds said lever in the dotted position until said dimes key is about to complete its return stroke. Then the arm $L^6$ comes in contact with the arm $S^3$ and the operation is as above described.

If, when the lever S is in the position shown by dotted lines, the depressed key of the dimes set be let go and allowed to be returned by the full force of the spring, it is possible that the momentum of the wheel N will carry it farther than is desired, i. e. one tooth. In order to prevent this the arm $S'$ of the lever S is provided with an extension $S^4$ from which projects a pin $S^5$ that passes behind a pawl T. These parts are so proportioned that when the arm $S'$ has completed its desired upward movement and is in normal position, the pin $S^5$ will be in contact with the back of the pawl and thereby form a stop for preventing the pawl from moving about its pivot. The pawl and the lever S thereby become rigid and the arm $S'$ is effectually prevented from rising higher. This being so, if the wheel moves farther it must first cause the pawl to recede from the path of its teeth, and in order to do this it must move the whole lever S toward the position indicated by dotted lines. But before it can overcome the momentum that the lever acquires in moving from the position shown by dotted lines to the position shown by full lines, its own momentum will be so far spent that it will not have force enough to move the lever toward the dotted position. When the wheel N is being turned by a direct pull on either of the dimes keys it can be moved with sufficient force to cause the pawl to recede and the lever to move a short distance toward the position indicated by dotted lines, but the lever can not be moved in this way far enough to bring the pawl in engagement with the next tooth.

Four equi-distant studs 70, projecting from the wheel $N'$ operate a lever $s$ in precisely the same way as the studs 65 operate the lever S. This lever $s$ is similar in construction and operation to the lever S, and the two have similar accessories that are indicated by similar letters of reference, capital letters being used for the lever S and its accessories and small letters for the lever $s$.

In order to prevent the operating mechanism from being reached and tampered with through the slots in which the keys work, each key is provided, upon the inside of the casing, with a shield $B^{11}$ which covers and closes its slot, or a portion of it.

What I claim as new, and desire to secure by Letters Patent, is—

1. The combination with two sets of keys, of two indicators each common to all of the keys of one of said sets, and means for transmitting motion from any of said keys to its appropriate indicator, said indicators consisting of sectors and shafts by which they are supported, the shaft of each sector being arranged in the path of the other sector whereby the movement of said sector is limited, substantially as set forth.

2. The combination with two sets of keys, of two indicators consisting of sectors I, $i$, the supporting shafts $I^3$, $i^3$, the sleeves $I^2$, $i^2$ mounted on said shafts and to which said sectors are secured in different planes, so as to overlap, the arms $I^4$, $i^4$ projecting from said sleeves, and means for transmitting motion from any key to the arm of the appropriate indicator, substantially as set forth.

3. The combination with two sets of keys, the shafts upon which they are fulcrumed, and two indicators, of the bars E, $e$ having the graduated shoulders $E'$, $E^2$, $e'$, $e^2$, &c., means for suspending one of said bars from each of said shafts in the path of the keys, and means for transmitting the movement of said bars to said indicators, all of the graduated shoulders of each bar being located at the same distance from the center of motion of the levers substantially as set forth.

4. The combination with a number of keys, of the graduated bar E adapted to be engaged and moved by any key, arms suspending said bar from the key-shaft the reciprocable rod $G'$ pivotally connected to said bar and having the slot $G^2$, a lever having a pin working in said slot, and an indicator common to all of said keys adapted to be moved by said lever, the arrangement of the slot and pin being such that the operated key may return to normal position, leaving the indicator set substantially as set forth.

5. The combination with a number of keys, and an indicator common to all of them, of the lever H engaging a portion of the indicator and having the arm $H'$ carrying pin $G^3$, the rod $G'$ having slot $G^2$ in which said pin fits, and means for transmitting to said rod more or less of the movement of any key, the arrangement of the slot and pin being such that the operated key may return to normal position, leaving the indicator set substantially as set forth.

6. The combination with a number of keys, a shaft upon which they are fulcrumed and an indicator common to all of said keys, of the lever H engaging a portion of the indicator and having the arm $H'$ carrying pin $G^3$, the rod $G'$ having the slot $g$ in which said pin fits, the graduated bar E to which said rod is pivotally connected, and arms suspending said bar from the key shaft in the path of the keys, the arrangement of the slot and pin being such that the operated key may return to normal position, leaving the indicator set substantially as set forth.

7. The combination with a number of keys, of an indicator common to all of them, consisting of a pivoted sector I, having the extension $I^4$, a lever having an arm engaging said extension, and means for transmitting to the lever more or less of the movement of any key, substantially as set forth.

8. The combination with a number of keys, of an indicator common to all of them, consisting of a pivoted sector I having an extension $I^4$, provided with a graduated cam face $I^5$, a lever having an arm engaging the cam face, and means for transmitting motion from any key to said lever, substantially as set forth.

9. The combination with a number of keys and an indicator common to all of them and having a character for each key, of a casing having a window large enough to display two of said characters, a curtain opposite one half of said window, a second indicator, and means for moving it to a position opposite the window and in front of said curtain, or withdrawing it therefrom, substantially as set forth.

10. The combination with a number of keys and an indicator having a character for each key of a casing having a window I', the curtain 20 arranged opposite one side of said window and bearing a figure, a second indicator 22, and means for moving it to a position opposite the window and in front of the curtain, or withdrawing it therefrom, substantially as set forth.

11. The combination with an indicator consisting of a pivoted sector of a disk similarly inscribed on opposite sides, and a casing having windows on opposite sides of said indicator, of two auxiliary indicators and means for bringing them in view at the sinister sides of the figures displayed by first named indicator substantially as set forth.

12. The combination with a number of keys and an indicator I, consisting of a pivoted sector of a disk having two sets of numbers representing the amounts represented by said keys, one set of said numbers being arranged upon each side of the indicator, of a casing having two windows, one opposite each side of said indicator, the indicators 22 and 220 located one on each side of said indicator I, and means for moving said indicators to positions opposite the respective windows, or withdrawing them therefrom, substantially as set forth.

13. The combination with the indicator I having similar series of numbers on both sides, and the casing having the windows I' and $I^{10}$ of the curtains 20 and 200 located opposite said windows, respectively, the indicators 22 and 220, the levers 23 and 230 by which said indicators are carried, the link 231 connecting said levers, and means for operating all of said indicators, substantially as set forth.

14. The combination of the key lever 32, the bar 34 attached thereto and extending across the front of the machine, the arm 31 projecting from said lever, the rod 30 pivotally connected thereto, an indicator, and means connecting the rod and indicator whereby the movement of the bar is transmitted to the indicator, substantially as set forth.

15. The combination of the indicator I, the lever H having arm $H^5$ engaging said indicator and having ratchet teeth $H^2$, the shaft 16, the shaft 17, the pawl $H^3$ supported by said shaft 17 and adapted to engage said ratchet, the shaft 36, the arm J projecting from the shaft 36 and adapted to engage said pawl, a number of keys, and means for transmitting motion from any of said keys to said shaft 36, substantially as set forth.

16. The combination with a number of keys, an indicator, the lever H having ratchet teeth $H^2$, means for transmitting motion from any key to said lever and means for transmitting motion from said lever to the indicator, a pawl $H^3$ for engaging the ratchet teeth and means common to all of the keys for tripping said pawl, substantially as set forth.

17. The combination with a number of keys arranged in more than one group or set, an indicator common to all of the keys of each set, and means for transmitting motion from any lever to its appropriate indicator, of a pawl and ratchet mechanism for holding each indicator in position when set, means common to all of the keys for tripping all of said pawls a latch for holding each pawl out of engagement, and means common to all of the keys of each set for causing the latch to liberate the pawl and permit it to re-engage the ratchet, substantially as set forth.

18. The combination with the keys B', $B^2$ &c., the indicator I, the ratchet lever H, means for transmitting motion from said lever to said indicator, the pawl $H^3$ adapted to engage said lever, the latch M adapted to engage said pawl, when tripped, the rod G' carrying said latch, and means for transmitting motion from said keys to said rod, of a second indicator, a key for operating it, and means operated by the latter key for tripping the pawl $H^3$, substantially as set forth.

19. The combination with a number of indicators a number of detents, and a number of keys, of means common to all of said keys for tripping all of said detents, a latch for catching each of said detents and holding it out of engagement until said latch is tripped, and means operated by each key for tripping one of said latches, substantially as set forth.

20. The combination of the indicators I, i, the levers H, H adapted to engage and operate them, having the ratchet teeth $H^2$, $h^2$, the shaft 16 on which said levers are loosely fulcrumed, springs $H^6$, $h^6$ engaging said levers for returning them to and holding them in normal positions, pawls $H^3$, $h^3$ engaging said ratchet teeth, the shaft 36 having arms J, J adapted to engage said pawls, a number of keys arranged in two sets, and means for transmitting motion from any of said keys to the shaft 36, substantially as set forth.

21. The combination of a number of keys, an indicator, the lever H having the ratchet teeth $H^2$, means for transmitting motion from said lever to said indicator, a pawl $H^3$ engaging the ratchet teeth $H^2$, the shaft 36 having arm J engaging said pawl, and a second arm K, a cam engaging the latter arm, and means common to all of the keys for operating said cam, substantially as set forth.

22. The combination with the pivoted indicator I, the spring $I^6$ by which it is returned to normal position, the lever H engaging said indicator and having the ratchet teeth $H^2$, the spring $H^6$ engaging said lever for returning it to normal position, the pawl $H^3$ engaging said ratchet teeth and a number of keys, the shaft 36, having an arm adapted to engage and trip said pawl, a second arm, and means common to all of the keys for operating said second arm, substantially as set forth.

23. The combination of a number of keys, an indicator, a detent for holding it when set, the arm K, a cam common to all of said keys and engaging said arm, for moving it when any key is operated, and means operated by said arm for tripping said detent, substantially as set forth.

24. The combination with an indicator, a detent for holding it when set, and a number of keys, of a movable arm, the movable pin K′ carried thereby, the cam $L^3$ having groove $L^5$, means common to all of the keys for operating said cam, and means operated by said cam for tripping said detent, substantially as set forth.

25. The combination with the cash drawer, a latch for holding it closed, and a number of keys, of a movable arm, the movable pin K′ carried thereby, the cam $L^3$ upon which said pin bears, having groove $L^5$, means common to all of the keys for operating said cam, and means for transmitting the movement of the arm to the latch, substantially as set forth.

26. The combination with two sets of keys, two indicators and a detent for holding each indicator when set, of the rock shaft 36 having two arms, one for engaging each of said detents, said shaft having also the arms K, k, two cams, one common to all the keys of each set, engaging said arms K, k, and means for transmitting motion from any key to its appropriate cam, substantially as set forth.

27. The combination with two sets of keys, two indicators, one common to all of the keys of each set, each of said indicators consisting of a pivoted sector, the levers H, h having arms $H^5$, $h^5$ engaging said indicators and having also the ratchet teeth $H^2$, $h^2$, the pawls $H^3$, $h^3$ engaging said ratchet teeth, the shaft 36 having arms J, j engaging said pawls and having also the arm 38 and arms K, k connection between each of the arms K, k and all of the keys of one set, and a drawer latch engaged and operated by the arm 38, substantially as set forth.

28. The combination with a number of indicators, a number of detents for holding them when set, a number of keys, and a shaft upon which they are fulcrumed, of a movable bar L′ common to all of said keys, arms L, $L^2$ also fulcrumed upon said shaft and carrying said bar, and means operated by said arms for tripping said detents, substantially as set forth.

29. The combination with two sets of keys, a register wheel for each, and means for transmitting motion from any key of each set to its appropriate register wheel, of mechanism for transmitting motion from one of said wheels to the other, means carried by the first wheel and operating upon the direct movement of any key of the first set for setting the transfer mechanism in operative position, a spring for operating said transfer mechanism and thereby turning the second wheel, and means common to all of the keys of the second set for preventing said spring from acting during the direct movement of any key of said second set, substantially as set forth.

30. The combination with two sets of keys, a register wheel for each, and means for transmitting motion from any key of the set to its appropriate register wheel, of a lever, means carried by the first register wheel for moving said lever in one direction, a movable bar common to all of the keys of the second set and adapted to partake of the movement of any of said keys, a part movable with said bar and adapted to engage said lever and move it in the opposite direction during the return stroke of the operated key of the second set, and means carried by said lever for engaging the second register wheel and operating it during said return stroke, substantially as set forth.

31. The combination of the shaft A, the keys B fulcrumed thereon, the ratchet wheel N loose upon said shaft, the graduated bar E having arms $E^\times$ suspended from said shaft, and the arm O projecting beyond it, the pawl O′ carried by the arm O and engaging the ratchet wheel N, the pinion N′ fixed to the ratchet wheel N and a register operated by the pinion N, substantially as set forth.

32. The combination of the shaft A, the keys B fulcrumed upon said shaft, the ratchet wheel N mounted loosely upon said shaft, means for transmitting motion from any of said keys to said ratchet wheel, the key lever 33 fulcrumed upon said shaft and having the special key 34, the ratchet wheel 61 having pins 65, the pawl 60 carried by the lever 33 and engaging the ratchet wheel 61, the lever S having the cam U lying in the path of the pins 65, whereby said lever is moved in one direction, the pawl T carried by said lever and adapted to engage the ratchet wheel N, means for moving said lever S in the opposite direction for turning said ratchet wheel, a register, and means for transmitting to it the movement of the ratchet wheel N, substantially as set forth.

33. The combination with the register wheel 61, and the register wheel N, of the lever S having the arm $S^3$, a pawl carried by said lever for engaging the wheel N, means carried by the wheel 61 for moving said lever in one direction, the arm $L^6$ in the path of which the arm $S^3$ lies when the lever S has been shifted by the wheel 61, and a spring for moving the arm $L^6$ and returning the lever S to normal position, substantially as set forth.

34. The combination with the keys $B'$ $B^2$ &c., the register wheel N operated thereby, the keys $b'$ $b^2$ &c., the register wheel $n$ operated thereby, and mechanism for transferring motion from the wheel N to the wheel $n$, of means carried by the wheel N for setting said transferring mechanism in operative position, and mechanism operating upon the return stroke of any of the levers $b'$ $b^2$ &c., for operating said transferring mechanism and moving the register wheel $n$, substantially as set forth.

35. The combination with the keys $B'$ $B^2$ &c., the register wheel N operated thereby, the keys $b'$ $b^2$ &c., the register wheel $n$ operated thereby, and mechanism for transferring motion from the wheel N to the wheel $n$ of the bar $l'$ adapted to be engaged by all of said keys $b'$ &c., the arm $l$ movable with said bar, and the arm $l^6$ movable with the arm $l$ and adapted to operate the transferring mechanism, substantially as set forth.

ALBERT H. ULLRICH.

Witnesses:
L. M. HOPKINS,
J. HALPENNY.